Aug. 16, 1927.
J. M. PALMER
1,638,874
TOOL HOLDER FOR LATHES
Filed May 4, 1925
2 Sheets-Sheet 1
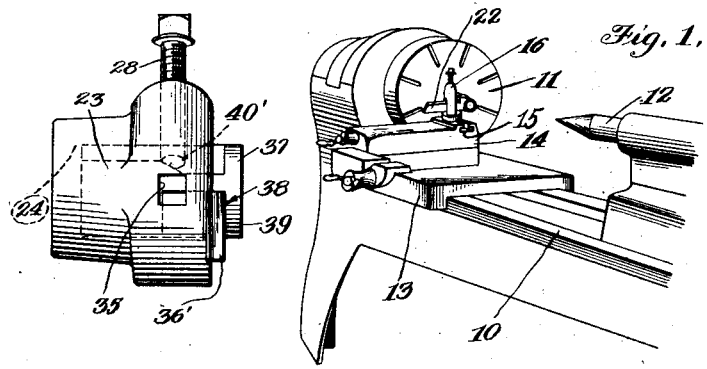
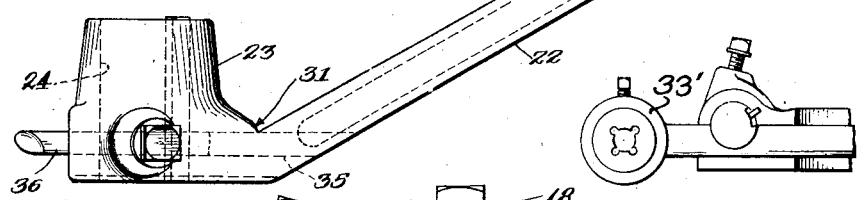
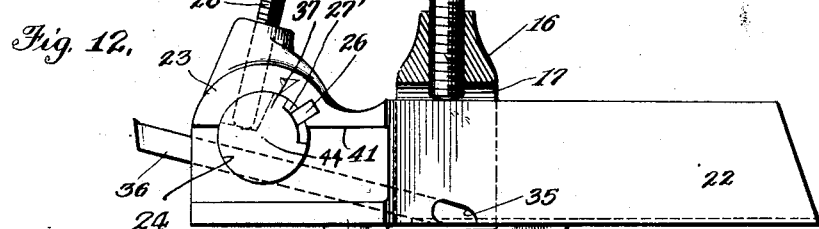
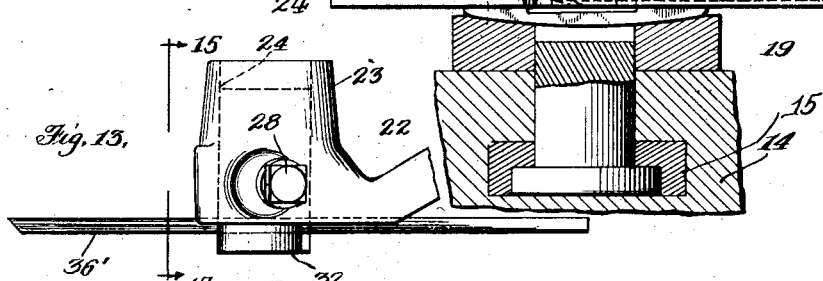
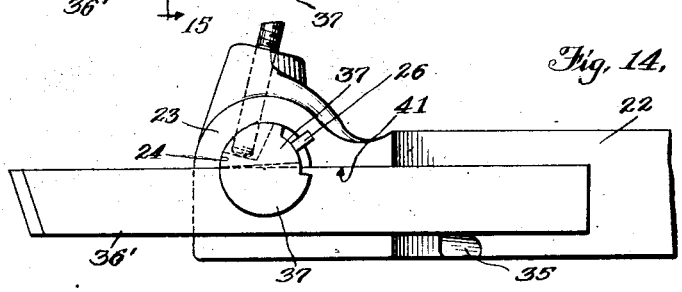
Inventor
John M. Palmer
Williams, Bradbury,
McCaleb & Kimble
Attys.

Aug. 16, 1927.
J. M. PALMER
1,638,874
TOOL HOLDER FOR LATHES
Filed May 4, 1925     2 Sheets-Sheet 2
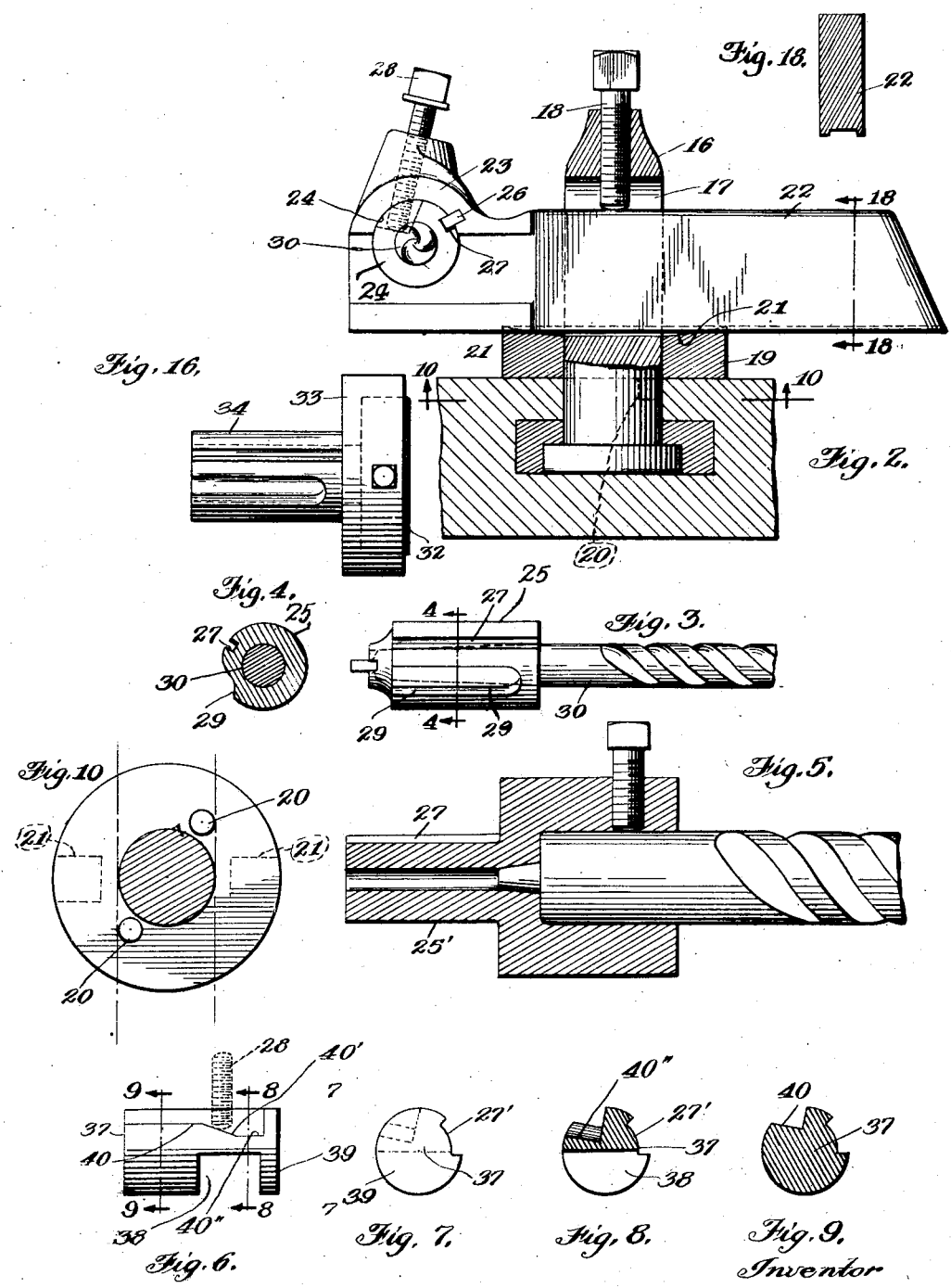
Inventor
John M. Palmer
By Williams, Bradbury, McCaleb & Hinkle attys.

Patented Aug. 16, 1927.

1,638,874

UNITED STATES PATENT OFFICE.

JOHN M. PALMER, OF CHICAGO, ILLINOIS, ASSIGNOR OF ONE-HALF TO JAMES D. O'NEIL, OF CHICAGO, ILLINOIS.

TOOL HOLDER FOR LATHES.

Application filed May 4, 1925. Serial No. 27,631.

My invention relates to tool holders for lathes and more particularly to a universal tool holder which can be used in the standard tool post of a lathe for holding a variety of different lathe tools—turning tools, cutting-off tools, drills, boring tools, dies, reamers, etc.—without the necessity of changing from one holder to another. This saves the time of the operator and also reduces the amount of equipment necessary for each lathe, at the same time enabling the standard lathe to do the things which now have to be done on a turret lathe and perform still other operations for which neither an ordinary lathe nor a turret lathe is adaptable. Thus, with my tool holder and tools therefor a die may be used for threading pipe lengths and, if desired, the tail stock of the lathe used to steady the work.

Another object of my invention is to provide an improved holder for cutting tools themselves which eliminates certain of the undesirable features of ordinary cutting tool holders.

A further object is the self centering of the tool holder to bring the tool into an accurate and proper alignment with the center line of the lathe, that is, without the necessity of manual adjustment for each such setting. This feature not only insures the accuracy of the work but materially lessens the time for setting up the tool.

As intimated above, one of the chief features of my tool holder is that it is ready to use on any standard lathe. It is not necessary that the lathe be built or rebuilt for use with my tool holder. Further than this my tool holder can be used on a lathe along with the present style tool holders.

These, together with further objects, features and advantages of my invention, are set forth in the following description of certain preferred embodiments thereof illustrated in the accompanying drawings. I contemplate, however, that many changes may be made without departing from the spirit or scope of my invention.

In the drawings—

Figure 1 is a perspective view of the essential parts of a lathe in the tool post of which I have shown my improved tool holder;

Figure 2 is a vertical section taken transversely of the lathe and looking toward the tail stock showing my tool holder mounted in the tool post and carrying a drill;

Figure 3 is an elevation of the drill carried by a supporting sleeve;

Figure 4 is a transverse section taken on the line 4—4 of Figure 3;

Figure 5 is a transverse section of a shanked sleeve which I use in my tool holder for supporting a large size drill;

Figure 6 is an elevation of the rotary locking member which I use in connection with my holder for mounting turning and cutting-off tools;

Figures 7, 8 and 9 are sectional views taken on the corresponding section lines of Figure 6;

Figure 10 is a horizontal section through the tool post looking upwardly at the bottom of the rest ring for the tool holder, which may be considered as taken on the line 10—10 of Figure 2;

Figure 11 is a plan view of my tool holder supporting a cutting-off tool;

Figure 12 is an elevation thereof showing the tool post, rest ring and rocker in vertical section;

Figure 13 is a fragmentary plan view of the holder shown supporting a cutting-off tool;

Figure 14 is an elevation thereof;

Figure 15 is a front elevation thereof;

Figure 16 is a front elevation of a die holder held in turn by my tool holder, and Figure 17 is an end elevation of the shank of my tool holder.

Figure 18 is a detail cross-section of the shank taken on the line 18—18 of Figure 2.

The standard lathe mechanism shown in Figure 1 comprises the usual bed with the face plate and chuck 11 mounted at the head thereof and the usual tail stock 12 at the other end. The automatic feed carriage 13 carries the usual cross slide 14 having a T slot 15 transverse thereof, but longitudinal of the lathe. The cross slide may be rotatably mounted on the carriage in the usual manner.

The tool post 16 which may be of standard design is mounted with the head thereof riding in the T slot 15 and is slotted as at 17 to receive the shank of a tool holder which may be clamped therein by the clamping screw 18.

The ring 19 forming the tool rest is of the usual design except that it has a pair of pins 20 projecting from its bottom face into the neck of the T slot 15 and that it has a diametrical slot 21 cut partway into its concave upper face.

In the tool post is supported my improved tool holder which comprises essentially a shank 22 of the usual size, the head 23 having a bore 24 preferably at an angle to the shank. A clamping member, rocker or sleeve 25 is mounted in the bore 24, but is not journalled freely, being held against appreciable rotation by a key 26 extending across the head and entering a keyway 27 cut along the periphery of the sleeve 25.

A locking screw 28 is threaded into the head 23 and projects into the bore thereof, but does not intersect the axis thereof. Instead, the locking screw is somewhat angularly disposed so that it bears against the shoulder of a notch 29 formed on the periphery of the sleeve 25, with sufficient leverage to turn the sleeve within the head and bind one face of the keyway 27 against the key 26. This firmly secures the sleeve 25 within the head 23, but does not tend to move its axis out of alignment with that of the bore 24. The shank of the drill 30 is inserted in the bore of the sleeve 25 with the flattened end of the shank passing into the flattened end of the bore to lock the drill against rotation. If the drill has a tapered shank, the sleeve obviously will be made with a tapered bore to receive it.

The slot 21 in the ring 19 is just the thickness of the shank so that the shank is locked to rotate with the ring. A working thrust on the drill tends to rotate the tool holder and the ring away from the face plate of the lathe, and to hold the pins 20 in engagement with the neck of the slot 15. In this way I definitely locate the drill in a position parallel with the center line of the lathe. The lower edge of the holder is preferably channeled out as indicated in Fig. 18 to prevent the tool holder rocking about any bit of the iron chips or other foreign matter between it and the ring rest. This helps to hold the drill horizontally without raising or lowering its point.

The drill is automatically brought into the same horizontal plane as the center line of the lathe because the height of the ring 19 and the depth of the slot 21 are designed to give the correct elevation to the drill. Thus, for different installations all that is necessary is to provide a ring of the right height if the ring already in use is not of suitable size.

To bring the drill into the same vertical plane as the center line of the lathe I provide a shoulder 31 which will abut the adjacent periphery of the post 16 and position the drill a definite distance from the center of the tool post and therefore the center of the T slot. A suitable index can be scratched on the cross slide to bring the T slot and tool post to the required position transversely of the lathe.

Thus, whenever a drill is to be used in the lathe the setting up operation is greatly simplified because the drill is automatically and accurately brought into alignment with the center line of the lathe. It is not necessary to use any of the more elaborate and less accurate devices now in use for mounting a stationary drill.

When the shank of the drill is of too large a diameter to make it practicable to insert the shank within the sleeve 25, an extension sleeve, such as shown in Figure 5, is used. In this case the shank 25' will have the same slot 27 and the notch 29. If the operator wants to cut threads on a rod by a die instead of turning them he can clamp the die 32 in a die holder 33 which has a shank 34 conformed similarly to the sleeve 25. When the stock to be threaded is of sufficiently small diameter the shank 34 may be made hollow and extend rearwardly of the die and in alignment with the axis of the die 32, so that the stock may pass through the shank and therefore through the head 23 of the tool holder. It will be obvious also that if desired the free end of the stock may be steadied by using the tail stock. Greater accuracy in the thread cutting can be secured by using the automatic feed for the carriage, which will feed the die positively at the required speed instead of letting the die pull the carriage or trying to feed the carriage by hand. I contemplate that the shank 34 need not protrude centrally and rearwardly of the die holder 33—especially if the stock be of too great a size to pass through the shank. For instance, the shank could extend radially from the periphery of the die holder and the tool holder turned through the necessary ninety degrees.

For holding the cutters themselves, especially the square sectioned turning cutters, I provide a square hole 35 which extends transversely through the head 23 at right angles to the bore 24 and intersecting the lower side of the bore. The cutter 36 is clamped in the tool holder by a rotary clamping member 37 which is, in general, of cylindrical shape and rotatably mounted within the bore 24 of the tool holder head.

This rotary locking member is shown in detail in Figs. 7 to 9. A slot 38 is cut across the lower side of the locking member near the forward end thereof, but spaced from the end by a thin end wall 39 which presents a closed end surface for the locking member flush with the forward edge of the holder.

The upper side of the locking member is cut away to form a shoulder 40 which, intermediate its ends, slopes longitudinally downward toward the front end of the locking member, as indicated at 40', the purpose of which will later be described.

The cutter 36 is inserted through the square hole 35 in the head and passes through the slot 38 in the lower side of the locking member. When thus positioned, and when the forward end of the locking member is pushed in to come about flush with the forward face of the tool holder head, the locking screw 28 engages the level portion 40'' of the shoulder 40 beyond the inclined portion 40'. Tightening the locking screw will cause its rounded end to press against the shoulder and, in turn, rotate the locking member counter-clockwise (Fig. 12). This brings the forward bottom edge of the slot 38 into contact with the upper edge of the square cutter 36, with the result that the locking pressure thereon is spread over a considerable area and the cutter is not only rigidly held within the tool holder, but there is no tendency to spread the upper edge of the cutter, which fits quite snugly within the square hole of the tool holder, as is the case when the locking screw directly contacts the cutter.

I prefer not to remove the key 26 from the head when using a cutter locking member 37. I therefore provide an arcuately enlarged keyway 27' in the rotary locking member 37, which permits the necessary rotation of the member to lock the cutter without binding against the key 26.

Such an enlarged keyway is, of course, necessary to permit rotation of the rocker 37, but another inherent advantage of the same is that the shoulder of the keyway located between the key 26 and the screw 28, and which limits the clockwise movement of the rocking member, automatically aligns the tool shank recesses in head and rocker, so that the shank can be easily inserted in the same by loosening the screw and manually turning back the rocker against this shoulder.

When a cutting off tool or other cutter 36' of rather flat cross-section is to be held in the tool holder, I insert it in the open slot 41 which extends horizontally across the front face of the head 23 and just below the axis of the bore 24. In this instance the locking member 37 is pushed forwardly beyond the front face of the head so that the end wall 39 embraces the upper edge of the outer side of the cutter 36' to prevent its displacement from the slot 41. When the locking member 37 is moved axially to such a position, the rounded end of the locking screw 28 contacts the inclined portion 40' of the shoulder 40, with the result that, as the locking screw rotates the locking member to clamp the cutter 36' rigidly in the tool holder, the tendency of the inclined shoulder 40' is to cam the tool holder inwardly to bind the end wall 39 more tightly against the outer side of the cutter 36'.

When the stock to be threaded is too large to make the use of a die holder of the type shown in Figure 16 practicable, the shank of the die holder 33' may extend radially therefrom as in Figure 17 and be of flat rectangular section like the cutting off tool 36'. This construction also has the advantage that the die can be brought into alignment with the axis of the lathe without manual adjustment other than adjusting the cross slide to the correct location transversely of the carriage.

The method of aligning my tool holding member is as follows:

The rocking member 37, being turned from regular circular steel stock, has its natural centers marked, as is shown at 44 by the slight depression usually made by a pointed tool before such turning operation. As has been already described, the ring 19 is made of such height as will position the tool holder at such a level that the axis of the bore 24 is in the horizontal plane of the axis of the lathe. The axis of the rocker 37 or any other tool placed in the bore 24 as a drill, will then always lie in the horizontal plane of the axis of the lathe. In order to set the tool so that both these axes are aligned, a centered pointed tool is placed in a chuck 11, the natural center 44 on one side of the rocker 37 is centered on this point by placing the point in the depression aforementioned, and the tail stock 12 is run up until its point coincides with the natural center 44 on the adjacent side of the rocker 37 and supports the rocker 37 by its point in the depression on that side; the rocker and tool holder are then supported between these two points, the axis of the rocker and lathe coinciding, and it is a simple matter to run the carriage in laterally guiding the shank 22 of the tool holder into the tool post 16, and to secure the shank in the tool post 16 by turning down the screw 18. As has been previously stated a suitable index can be scratched on the cross slide to bring back the T-slot and tool post to the required position transversely of the lathe at any time.

One of the inherent advantages of my tool holder then is its capability of being quickly aligned with the axis of the lathe so that when desired the ordinary cutting tools may be removed, as well as the rocker 37, the carriage run in transversely to the axis of the lathe until the center of the bore 24 coincides with the said axis and a drill, reamer, tap or any other tool which must be centered may be placed in the bore 24, such tools either having a shank, previously described, or an adapting sleeve. The tool is centered by placing the transverse carriage at the index mark already referred to.

While I have chosen to show my tool holder as applied to a lathe, it is to be understood that many of the features of my invention can be applied to tool holders for other machine tools, such as planers or shapers, for example. I also contemplate that many tools other than the forms of cutters shown and the dies, drills boring tools and the like disclosed can be adapted to use with the tool holder of my invention. I also contemplate that many changes may be made in the tool holder and accessories shown without departing from the scope or spirit of my invention.

What I claim is:

1. In a lathe tool, a supporting shank, a head having a circular bore in the same, a rocker member journalled in said bore, and means carried by said rocker member for aligning said bore in the axis of a lathe.

2. In a device of the class described, a supporting shank, a head having a circular bore in the same, a rocker member pivotally supported in said bore, said head and said rocker member having a plurality of recesses extending into said head and said rocker member transversely to said bore, for the purpose of holding tools in various positions, and means for rocking said rocker member in said bore to clamp a tool in any recess.

3. A tool holder comprising a shank, a head having a bore in the same for journalling a shanked tool, a key in the head, and a screw in the head for rotating the shanked tool into contact with the key.

4. A tool holder comprising a shank, a head having a circular bore in the same for journaling a tool, a key in the bore disposed longitudinally thereof, and a locking member carried by the head for rotating the tool to bind it against the key.

5. A tool holder comprising a supporting shank, a head having a circular bore in the same and a recess extending into the head transversely of the bore and intersecting one side thereof, a rotary locking member journalled in the bore, and a locking screw for rotating the locking member to clamp it against a cutter in the recess.

6. A tool holder comprising a supporting shank adapted to be clamped in the tool post of a lathe, a head having a bore in the same, a locking screw threaded in the head and extending into the bore in off-center relation thereto, a tool supporting member journalled in the bore having a shoulder engaged by the screw to rotate the member, and a cooperating key and keyway on the head and on the member for binding the latter to the head when the member is thus rotated.

7. A tool holder comprising a supporting shank adapted to be clamped in the tool post of a lathe, a head, a tool supporting member rotatably journalled in the head, a cooperating key and keyway on the head and on the member for binding the member on the head, and locking means for rotating the member to bind the key and keyway.

8. A tool holder having a head having a bore in the same, a supporting shank extending from the head, a tool securing member rotatably mounted in the head, and a locking screw threaded in the head for engaging and rotating the said member to lock it rigidly to the head.

9. A tool holder comprising a head, a supporting shank extending therefrom, a clamping member rotatably mounted in the head, means carried by the member for engaging an edge and a side of a cutting tool, and a clamping screw for engaging the clamping member, the member presenting a cam surface to the screw for causing said engaging means on the member to bind against the side of the tool as the member is rotated to clamp against the said edge of the tool.

10. In a device of the class described, a supporting shank, a head having a circular bore in the same, a rocker member journaled in said bore, said head having a recess extending into the same and said rocker member transversely to the said bore, and means for rotating the said rocker member in said bore to clamp a tool in said recess.

11. In a device of the class described, a supporting shank, a head having a circular bore in the same, a rocker member journaled in said bore, said head having a recess extending into the same and said rocker member transversely to the said bore, and means for aligning the recesses of said head and rocker member.

12. In a device of the class described, a supporting shank, a head having a circular bore in the same, a rocker member journaled in said bore, said head having a recess extending into the same and said rocker member transversely to the said bore, and means comprising a key in said bore and a cooperating shoulder on said rocker member for aligning the recesses of said head and rocker member.

13. In a device of the class described, a supporting shank, a head having a circular bore in the same, a rocker member journaled in said bore, said head having a recess extending into the same and said rocker member transversely to the said bore, and means comprising a key in said bore and an enlarged keyway in said rocker member for aligning the recesses of said head and rocker member, and permitting relative rotation between said head and rocker member.

14. In a device of the class described, a head having a circular bore in the same, a rocker member journaled in said head, said head having a slot in the same extending into said bore transversely thereto, said rocker having a recess in the same adapted to be aligned with said slot, and means for rotating said rocker member in said bore to clamp a tool in said recess.

In witness whereof, I hereunto subscribe my name this 25th day of April, 1925.

JOHN M. PALMER.